Jan. 30, 1940.    LE ROY SMELKER    2,188,545
TRAILER
Filed Oct. 14, 1937    4 Sheets-Sheet 3
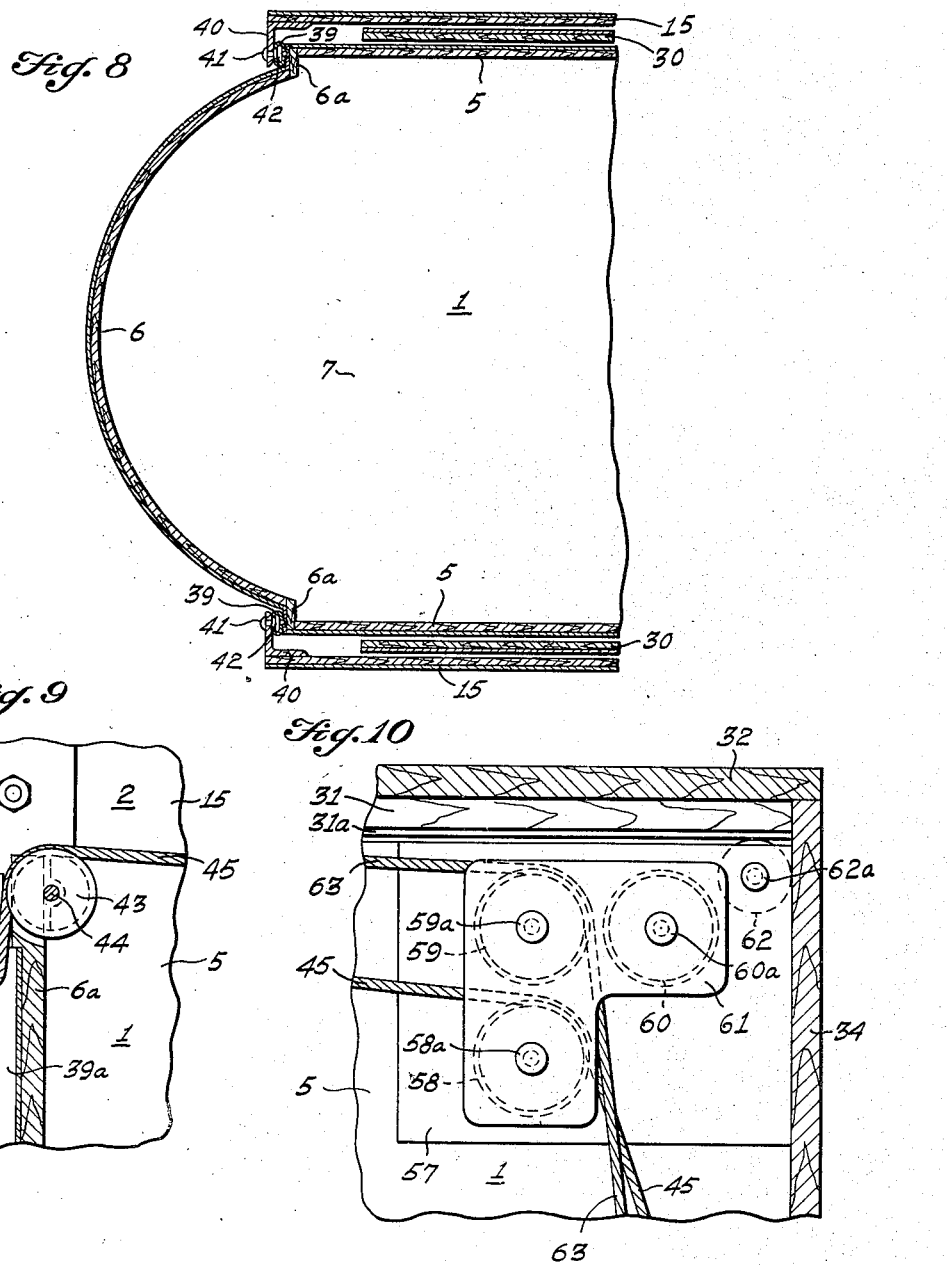
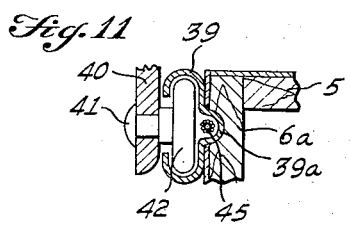
Inventor
LE ROY SMELKER
By Toulmin & Toulmin
Attorneys Jan. 30, 1940.   LE ROY SMELKER   2,188,545
TRAILER
Filed Oct. 14, 1937   4 Sheets-Sheet 4
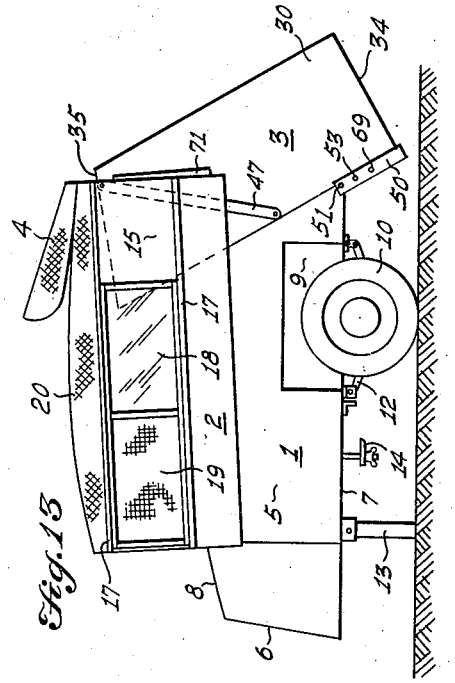
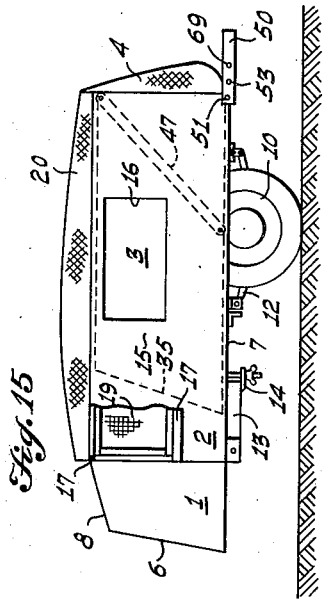
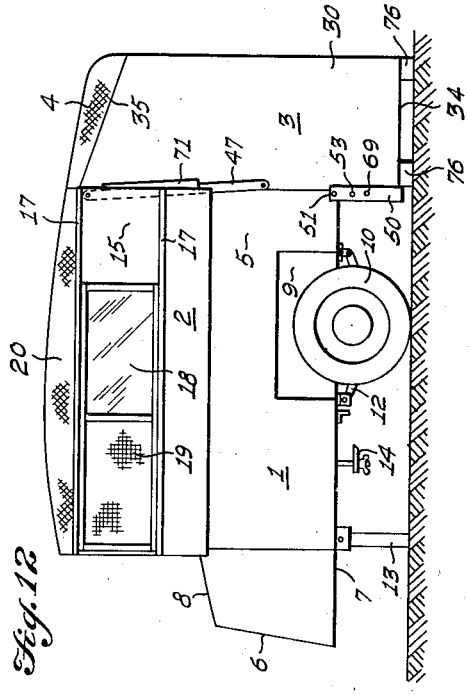
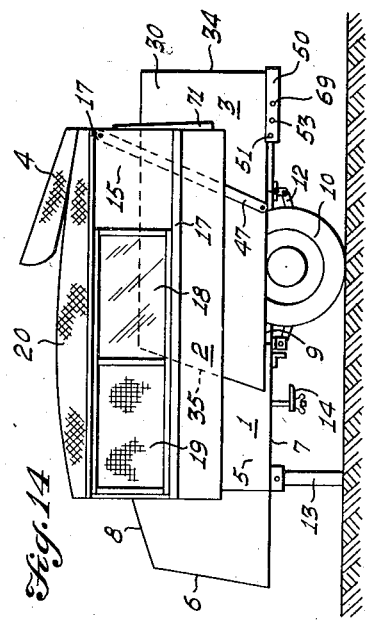
Inventor
LE ROY SMELKER
By Toulmin & Toulmin
Attorneys Patented Jan. 30, 1940

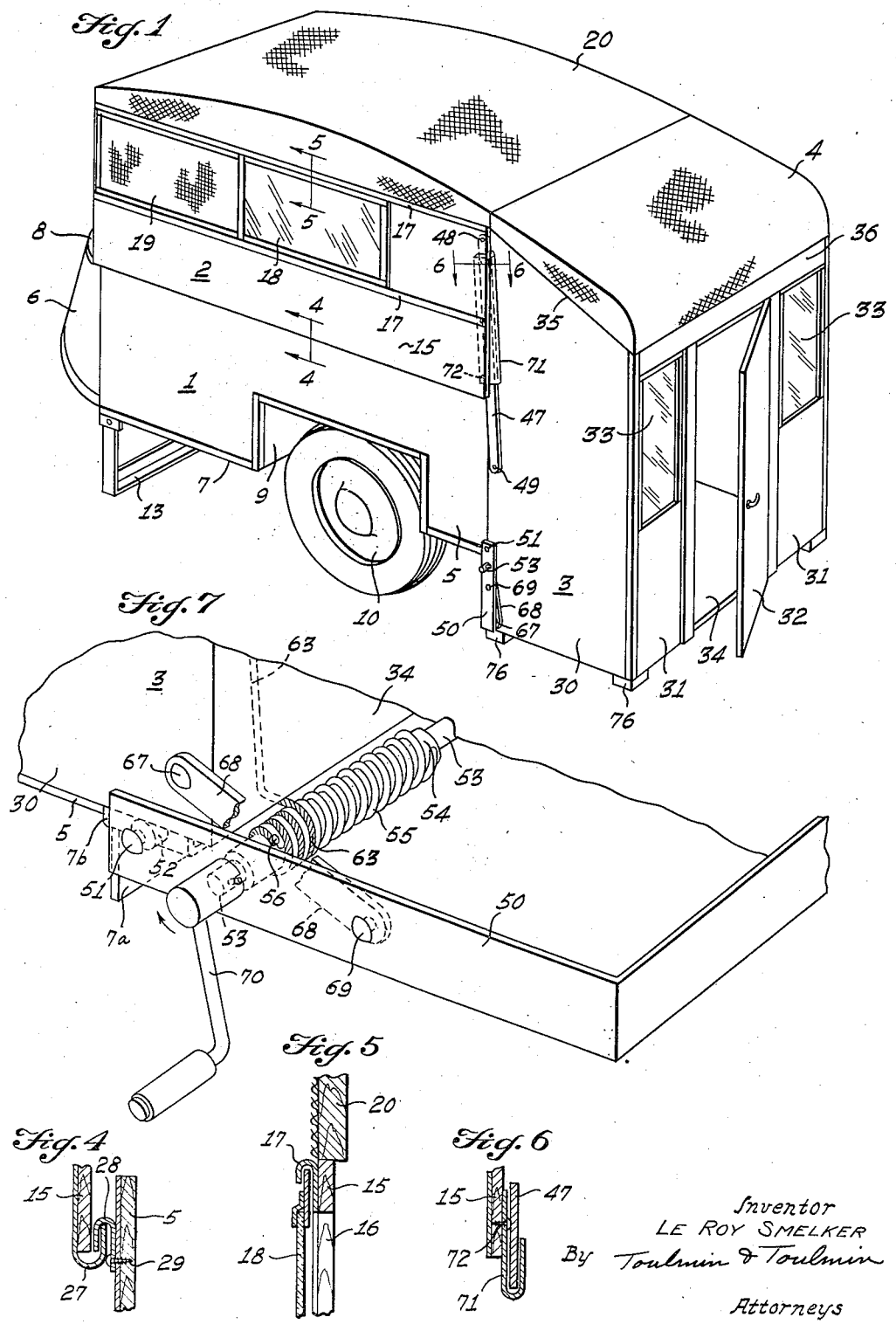

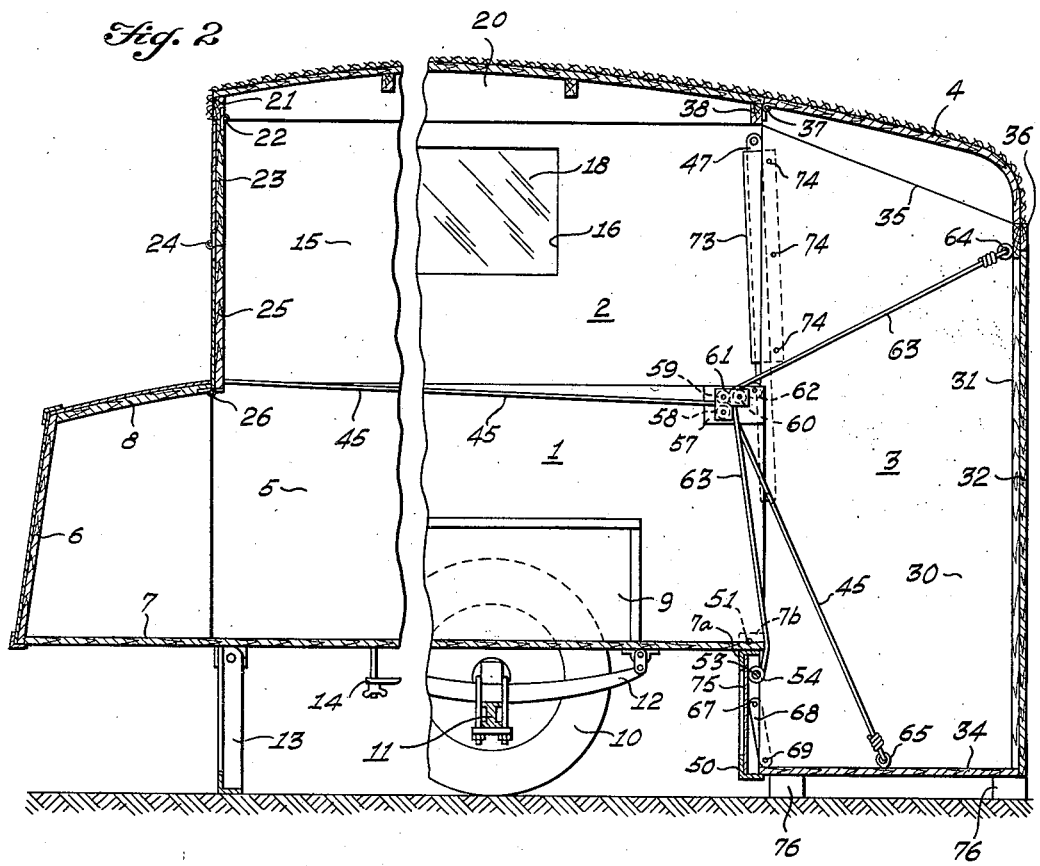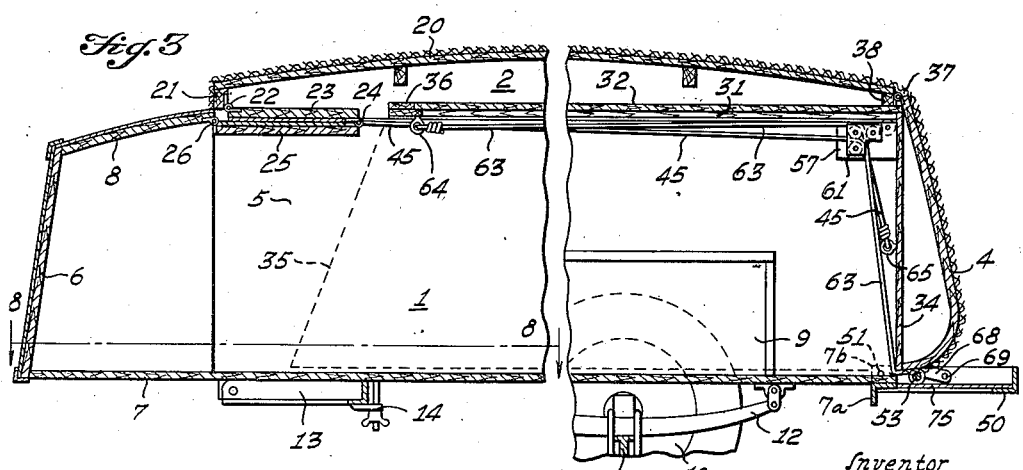

2,188,545

UNITED STATES PATENT OFFICE 2,188,545

TRAILER

Le Roy Smelker, Dayton, Ohio

Application October 14, 1937, Serial No. 168,983

11 Claims. (Cl. 296—26)

This invention relates to trailer constructions and, in particular, to automotive trailers.

It is an object of this invention to provide a collapsible trailer body construction.

It is a further object of this invention to provide such a construction which is extensible both lengthwise, or longitudinally, and heightwise, or vertically.

It is a further object of this invention to provide such a body construction which is extensible both longitudinally and vertically to provide adequate space for habitation without increase in width.

It is a further object of this invention to provide such a structure which may be readily and conveniently collapsed for convenience in towing by a tractor vehicle or readily and conveniently extended, or set up, for use as a stationary habitable housing unit.

It is a further object of this invention to provide such a structure wherein the body comprises a plurality of articulated body members adapted to be collapsed or extended with greatest facility and ease.

It is a further object of this invention to provide such a body structure wherein the collapsed structure is readily portable and is economical to operate because possessed of low wind resistance due to its reduced area, possessed of extreme stability and absence of side sway due to the low center of gravity of the collapsed structure, and which provides full visibility of the road from the tractor vehicle attached thereto due to the slight height of the collapsed structure.

It is a further object of this invention to provide such a structure which embodies the utmost simplicity of construction and is possessed of the utmost rigidity and least possible weight.

It is a further object of this invention to provide a trailer body comprising vertically collapsible upper and lower members having associated therewith a vestibule which is longitudinally extensible to provide for lengthening the body when extended.

It is a further object of this invention to provide such a structure wherein the members are provided with flanges which securely interlock upon extension of the body to provide a weatherproof construction.

It is a further object of this invention to provide, in such a body, a vestibule which provides a dropped floor portion for the sake of adequate head room and which has the floor thereof adapted to be disposed closely adjacent and in supported relation to the ground or terrain upon which the trailer wheels are supported in order to obviate necessity for reliance upon the brakes of the tractor vehicle to retain the trailer in fixed position.

It is a further object of this invention to provide such a body construction wherein, despite the collapsibility of the structure, a full length one-piece door is provided.

It is a further object of this invention to provide such a body construction wherein the component parts are so balanced and connected that extension and collapse thereof may be readily and conveniently accomplished with least possible expenditure of energy and by the performance of the fewest possible simple manual operations.

It is a further object of this invention to provide, in such a trailer body construction, mechanical connections between the component parts which are constantly protected from the weather and wherein relative movement between the parts is initiated by a simple and convenient cranking operation in the same direction, both for collapsing the extended parts and for extending the collapsed parts.

It is a further object of this invention to provide such a structure wherein window aperture means is built into the upper body member and which has associated therewith connected wire screen and glass window means movable with respect to the aperture, whereby the aperture may be selectively closed by the mesh screen member or by the glass member.

It is a further object of this invention to provide such a structure wherein the lower or stationary portion of the collapsible body is particularly adapted to support and enclose all equipment necessary for habitation of the trailer body in such manner as to be undisturbed by collapse or extension of the movable body members with respect to the stationary body member.

It is a further object of this invention to provide such a construction wherein the movable vestibule member, which provides for longitudinal extension of the body, is adapted to function as a part of the mechanical connecting means between the upper and lower trailer body members.

It is a further object of this invention to provide, in such a construction, a vestibule adapted, when extended, to prevent accidental collapse of the trailer body in such manner as to provide a safe, secure and substantially rigid habitable housing unit.

These and other objects and advantages will appear from the following description taken in connection with the drawings.

In the drawings:

Figure 1 is a perspective view of a trailer body constructed according to the principles of this invention in extended position;

Figure 2 is a longitudinal central vertical section through the structure of Figure 1, showing the body in extended position, as in Figure 1;

Figure 3 is a view similar to Figure 2, but showing the structure in collapsed position;

Figure 4 is a section taken along the line 4—4 of Figure 1;

Figure 5 is a section taken on the line 5—5 of Figure 1;

Figure 6 is a section taken along the line 6—6 of Figure 1;

Figure 7 is an enlarged detail view, in perspective, of a portion of the connecting means shown in Figures 1, 2 and 3;

Figure 8 is a section taken on the line 8—8 of Figure 3;

Figure 9 is an enlarged detail view of structure partially shown in Figure 8;

Figure 10 is an enlarged detail view of structure shown in Figure 3;

Figure 11 is an enlarged detail view of structure shown in Figure 8;

Figure 12 is a diagrammatic view of the trailer body in open or extended position;

Figure 13 is a view similar to Figure 12, but showing the body structure in intermediate position, next to open position;

Figure 14 is a view similar to Figures 12 and 13, but showing the body structure in a second intermediate position, next to closed or collapsed position; and Figure 15 is a view similar to Figures 12, 13 and 14, but showing the body structure in fully closed or collapsed position.

Referring to the drawings in detail, the trailer body is formed of three main parts, namely, the stationary or lower body member 1, the vertically movable upper body member 2, which cooperates with the lower body member 1 in substantially telescopic manner, and the vestibule member 3 which is slidably and swingably connected to the lower body member 1 and upper body member 2 and which is adapted to have its upper end closed by the vestibule top member or flap member 4, as illustrated in Figures 12, 13 and 14.

The lower or stationary body member 1 is provided with side walls 5 and an arcuate and inclined forward wall 6 which extends forwardly of the main body and which has its lower end secured to the floor 7 and its upper end secured to the wall 8 to form a streamlined front for the stationary member 1 of the trailer body. The stationary body member 1 is provided at each side with a suitable wheel box or well 9 for accommodation of the wheels 10 which are mounted on the axle 11 which has a spring 12 secured thereto at each end, which springs are attached in suitable manner to the floor 7 of the stationary body member 1 or to any suitable frame means secured thereto.

At the forward end of the stationary body member 1, a suitable support bar 13 is pivotally secured to the floor 7 and suitable latch means 14 is provided for securing this member in its uppermost position, as shown in Figures 3 and 15, and the member 13 is adapted, when extended to its downward position, as shown in Figures 1, 2, 12, 13 and 14, to support the weight of the forward end of the trailer body.

The top portion of the stationary body member 1, rearwardly of the wall 8, is open as is also the rear end thereof.

The upper body member 2 is provided with side walls 15 having window apertures 16 therein and substantially horizontal trackways 17 are secured at top and bottom of the aperture 16 on the outside of each side wall 15 for slidably receiving a slide member comprising a suitable framework having rigidly secured in one end thereof a glass window pane or plate 18 and having suitably secured at the other end thereof a plate or sheet 19 of suitable metal screen mesh (Figs. 1, 5 and 12 to 15). By slidably adjusting the slide member in the trackway, the aperture 16 may be closed by the screen mesh 19, for ventilation, or by the window glass or pane 18.

Secured at the top of the side walls 15 is the top member 20 which is provided with suitable transverse bracing and which may be formed in any desired manner. At the forward end of the top member 20 is the transverse member 21 having suitable hinge means 22 thereon, by means of which the panel 23 is attached thereto. This panel is secured at its lower end by means of hinge 24 to the lower panel 25, which has its lower end pivotally attached by hinge means 26 to the wall member 8. Each side wall 15 is provided at its lower edge with an inwardly and upwardly directed flange 27 which is adapted to engage the downwardly and outwardly directed portion of a flange strip 28 suitably located upon each side wall 5 and rigidly secured thereto in any suitable manner as by means of screws 29 (see Figure 4).

The vestibule member 3 has side walls 30 and a rear wall comprising side panels 31 connected by the swingable door 32, and each side panel 31 is optionally provided with a glazed window 33 for purposes of admitting light to the interior of the vestibule 3. Suitably connected to the lower edges of the side panels 31 of the rear wall and the side walls 30 is the floor 34. The side walls 30 have inclined upper edges 35, and the rear wall terminates at its upper end in the transverse member 36 having a straight edge. The edges 35 of the side walls 30 and the upper edge of the member 36 are adapted to be closely engaged by the lower edges of the vestibule top member or flap member 4 which is connected by means of hinges 37 to the cross brace member 38 of the top 20 of the upper body member 2.

The walls of the above-described members are shown as constructed of wood or fiber board with the top member 20 and vestibule top member or flap 4 provided with suitable waterproof textile fabric material. The walls of the stationary body member 1 and upper or movable body member 2 and the vestibule 3 are shown as provided with a metallic sheathing or covering. It is, of course, to be understood that the above described and illustrated construction is merely demonstrative and that the respective members may be formed of any suitable material having the desired properties such as metal, either insulated or otherwise, plaster board, fiber board and other similar materials. It is also to be understood that any suitable bracing may be provided in known manner for increasing the rigidity of the respective members, where such practice is found desirable.

The means for supporting the members 1, 2 and 3 in such manner that they may be extended as shown in Figure 2 or collapsed as shown in Figure 3, and the means for the accomplishment of the extending and collapsing operations are as follows. The curved or arcuate wall 6 has its lateral edges secured to the side walls 5 of the stationary body member 1 by means of vertical strips 6a, and rigidly secured to the outside of each of these strips 6a, as shown in Figures 8, 9 and 11, is a suitable track member 39 which is rigidly secured to the member 6a. This track member is of arcuate cross section and has an arcuate channel 39a formed in the rear central portion thereof. The forward edge of each side wall 15 has rigidly secured thereto an angle member 40 disposed vertically and with a roller pintle 41 rigidly secured thereto, which roller pintles rotatably support the rollers 42.

The roller members 42 are adapted to move vertically in the trackway provided by the track member 39 to provide vertical guide means for guiding the movable body member 2 with respect to the stationary body member 1 from the position of Figure 2 to that of Figure 3 and vice versa. The means for raising the forward end of the body member 2 comprises a pulley 43 rotatably mounted on a transverse horizontal pivot 44 which is secured at the forward upper corner at the inside of each side wall 5 of the stationary body member 1, as shown in Figure 9. A cable member 45 extends over each of these pulleys 43 and has its forward end rigidly secured by any suitable clamp means 46 to the corresponding angle member 40, as also shown in Figure 9.

As will be most clearly understood, application of tension to the cables 45 will cause guided upward movement of the forward end of the movable body member 2 with respect to the stationary body member 1. The means for causing upward movement of the rear end of the movable body member 2 with respect to the stationary body member 1 comprises a pair of link members 47, each of which is pivoted at its upper end to a wall 15 of the movable body member 2 at the inside and each link has the lower end thereof pivotally secured at 49 to a side wall 30 of the vestibule member 3 at the outside thereof. Also pivotally secured to the transverse angle member 7a disposed at the rear of the floor 7 of the stationary body member 1 is the U-shaped bumper bar 50 which has each end thereof secured to the outside of a wall 5 at the lower corner thereof by means of a bolt or rivet 51 which extends inwardly through the wall 5 and an upturned end 7b of the angle member 7a and has a suitable roller 52 thereon for providing antifriction support means for the vestibule member 3.

Disposed transversely and having each end secured for rotation in a side of the bumper bar 50 is a windlass shaft 53 having rigidly affixed thereto at each end a windlass pulley 54 of the screw type, i. e., having the spiral guide means 55 thereon for guiding a cable (hereinafter described), having its end fixed thereto by the pin 56 (Figure 7). This cable is hereinafter more clearly described and hereinafter designated 63.

As shown in detail in Figure 10, a plate member 57 is secured at the upper rear corner of each side wall 5 of the stationary member 1 at the inside thereof, and each plate 57 carries suitable supporting pintles 58a, 59a and 60a carrying respectively pulleys 58, 59 and 60 which are freely rotatable with respect to the plate and the bracket means 61 thereon, which supports one end of each pintle member. Also carried by each plate member 57 is a pintle member 62a which rotatably supports a track support roller 62, each of which is adapted to support a suitable track member 31a affixed to the inside of a panel 31 of the rear wall of the vestibule, as shown in Figure 10.

The foremost upper pulley 60 is adapted to support an intermediate portion of a cable 63 in the collapsed position of the body, as shown in Figure 3, while the rearmost upper pulley 60 is adapted to support this intermediate portion of the cable 63 in the extended position of the body, as shown in Figure 2. One end of each cable 63 is secured to an eye member 64 affixed to the forward or upper portion of the rear wall of the vestibule member 3, while the opposite end thereof is affixed by a pin 56 to one of the windlass pulleys 54, as described above.

Each of the lowermost pulleys 58 supports an intermediate portion of the cable 45 which, as described above, is secured, as shown in Figure 9, to an angle member 40 and passes over a pulley 43 at the forward and upper corner of each side wall 5. The opposite end of this cable 45 is secured to an eye member 65 which is rigid with the floor 34 of the vestibule member 3. Each cable 45 is of fixed length due to the fact that one end thereof is rigidly secured to an angle 40, while the opposite end is secured to an eye member 65.

Pivotally secured at one end to each of the pin or pintle members 67, extending outwardly from the side walls 30 of the vestibule member 3, is a link member 68 having the opposite end thereof pivotally secured by means of the pin member 69 to an inner side of the bumper bar 50, as shown in Figure 7. Due to the pivotal connection at 51 of the bumper bar 50 with the side walls 5 of the stationary body member 1, the vestibule member 3 may be slidably moved a predetermined distance, with respect to the stationary body member 1 by manually tilting the bumper bar 50 from the position shown in Figure 15 to that shown in Fig. 13. When the bumper bar 50 is pushed downwardly to the position substantially midway between the positions shown in Figures 13 and 14, the pintle member 67 will be disposed substantially vertically above the pin member 69. Further rearward movement of the vestibule member 3 to the rear will cause the bumper member 50 to be raised to the position shown in Figure 14, at which time the bottom wall 34 of the vestibule will be substantially in alignment with the rear or bottom cross portion of the bumper bar 50, as shown in Figure 14.

The rearward movement of the vestibule to a position wherein the pintle member 67 will be vertically disposed above the pin member 69 is achieved by manually pushing down the bumper bar 50, as above described, and this rearward movement of the vestibule member 3 serves to free the cable 63 whereupon tension may be applied thereto through rotation of the windlass shaft 53 and windlass pulleys 54 in the direction of the arrow to shorten the cable 63. Shortening of the cable 63 will cause the vestibule member 3 to move rearwardly until the bottom wall thereof contacts the transverse portion of the bumper bar 50 (Figure 13).

As shown in Figure 7, a suitable crank 70 is provided for rotating the windlass shaft 53 and its attached windlass pulleys 54. As pointed out above and as illustrated in Figure 4, cooperating flange means are provided for interlocking engagement upon extension of the body member 2 with respect to the body member 1 to make a weatherproof construction and it is, of course, to be understood that such suitable flange means may be provided at the lower portion of each forward edge of each side wall 30 of the vestibule member 3 and at the rear edge of each side wall 5 of the body member 1. Due to the position of the link member 47 between the inner side of the wall 15 and the outer side of the wall 30, it is necessary that offset flange means be provided for closing the space between these walls when the body member is extended. These means comprise a flange strip 71 secured in suitable manner, as by means of screws 72, to the inner side of each side wall 15 at its rear edge in such manner that, when the body is extended, as shown in Figure 1, the flange strip 71 will closely engage the rear edge of the link 47.

A similar and oppositely disposed flange strip 73 (Figure 2) is secured to the upper edge portion of each side wall 30 of the vestibule member 3 at the inside thereof in such manner that, when the link member 47 is engaged by a flange strip 71, it will be likewise engaged by a flange strip 73 to provide a weatherproof joint between the rear edges of the side walls 15 of the body member 2 and the upper forward edges of the side walls 30 of the vestibule member 3. The flange strips 73 are secured by suitable means such as screws 74 to the side walls 30 of the vestibule 3, as shown in Figure 2. The flange strips 71 and 73, because of their cooperation with the link 47, provide support for the upper end of the vestibule member 3 and securely connect the upper end thereof (through the connecting links 47) to the movable body member 2. The bumper bar 50 is provided with a suitable plate member 75 to seal the lower forward end of the vestibule when extended, as shown in Figure 2.

As is most clearly shown in Figure 2, when the body members 1, 2 and 3 are in extended position, the joints at the respective walls are securely sealed and made weatherproof. By means of the particular arrangement of operating parts, the body, when in the extended position, as shown in Figure 2, may be collapsed or placed in the position shown in Figure 3, or vice versa, with great ease and facility.

The operation of the common extending and collapsing apparatus is as follows. When the body is collapsed or in the position shown in Figures 3 and 15, the panel members 23 and 25 are disposed substantially horizontally and are closely adjacent one another, while the side walls 5 of the body member 1 are covered by the side walls 30 of the vestibule member 3, which side walls are, in turn, covered by the side walls 15 of the movable body member 2. The vestibule top member or flap 4 is disposed in downward position in such manner as to complete the streamline appearance of the trailer body, as shown in Figures 3 and 15. The body is then readily portable and the parts thereof are in the position taken by them when the body is attached to a suitable tractor vehicle for movement thereby.

The flap of the vestibule top 4 is swung upwardly from the position shown in Figures 3 and 15 to that shown in Figures 13 and 14, and downward force is applied to the rear portion of the bumper bar 50 in such manner that the link member 68 will draw the vestibule 3 rearwardly until the pintle member 67 is disposed vertically above the pin member 69. The vestibule member 3 will then be disposed in a position intermediate that of Figure 13 and that of Figure 14. The cable 63 will have been freed from binding by this movement of the vestibule and the crank 70 is then utilized to place tension upon the cable 63 in such manner as to fully extend the vestibule until the bottom wall 34 thereof abuts the rear portion of the bumper member 50.

Meanwhile, due to the fixed length of the cable 45, the upper end of the body member 2 will have been raised to the position shown in Figure 14, while rearward movement of the vestibule member 3 will have placed the link 47 in a more vertical position to raise the rear portion of the body member 2 a similar amount, thus maintaining the movable body member 2 in horizontal position. The parts are then in the position shown in Fig. 14.

Thereafter, the cranking is continued and, as further rearward movement of the vestibule member 3 with respect to the bumper bar 50 is prevented, further shortening of the cable 63 by the continued cranking causes the vestibule member 3 and bumper bar 50 to be swung downwardly until they approach the position shown in Figure 13. Simultaneously, the link member 47 further approaches a vertical position, which further raises the rear end of the movable body member 2 to clear the upper end of the vestibule member 3.

When the parts have reached the position shown in Figure 13, the vestibule member 3 is placed in such acute balance that a slight downward push upon the rear or lower end thereof will cause it to swing the bumper bar 50 further in clockwise direction to the position shown in Figure 12. Meanwhile, due to the fixed length of the cable member 45, the forward end of the movable body member 2 will be raised from the position shown in Figure 13 to that shown in Figure 12. The vestibule top member or flap member 4 is then swung downwardly from the position of Figure 13 to the position of Figure 12 and the body is then in fully extended position. During the movement of the body members from the position of Figure 3 to that of Figure 2, or from that of Figure 15 to that of Figure 12, the panels 23 and 25 have been extended from flat and abutting position to substantially vertical, extended position as shown in Figure 2.

As shown in Figures 12 and 2, it may be preferable, in order to space the floor 34 of the vestibule member 3 from the ground, to utilize block members 76 or the like, but it is, of course, to be understood that the use of such means is entirely optional and that, by suitable adjustment of the level of the floor 7 with respect to the ground, the need for the use of such block means may be totally obviated. When the trailer body is in the extended position, as shown in Figures 1, 2 and 12, it is merely necessary, in order to collapse the trailer body, to reverse the above described operations which are performed as follows.

With the parts in the position illustrated in Figure 12, the vestibule top member or flap member 4 is swung upwardly in counterclockwise direction to the position shown in Figure 13. The windlass shaft 53 and pulleys 54 are rotated in the direction of the arrow by cranking to shorten the cable 63 for swinging the vestibule member 3 to the position of Figure 13 and lowering, at the same time, the front portion of the movable body member 2 (while the rear portion thereof is supported by link 47) to place the parts in the position of Figure 13. Pressure is then applied to the top portion of the vestibule member 3 to bring the parts to the position shown in Figure 14. Forwardly directed force is then applied to the floor of the vestibule to move it fully forwardly to the position shown in Figures 3 and 15, at which time the hinged vestibule top member or flap member 4 will be swung downwardly or in clockwise direction to the position shown in Figure 15.

While no such means are shown, it is, of course, to be understood that suitable latch and locking means may be provided for maintaining the vestibule top member securely to the top of the vestibule member 3 when the vehicle is extended and also for securing it in position when in the collapsed position, as shown in Figures 3 and 15.

It is particularly to be noted that the bumper bar member 50 provides guide means for the vestibule member during extension thereof and retraction thereof for collapsing the body, and that it also provides support means for the forward lower end portion thereof when the vestibule is fully extended. The plate member 75 thereon likewise provides a closure for the lower forward side of the vestibule member below the floor 7 of the stationary body member 1 and, when the bumper bar 50 is in horizontal position and the body is in closed or collapsed position, as shown in Figures 3 and 15, the bumper bar provides protection for the trailer body.

It will thus be seen that I have produced a structure which is extremely simple and which may be readily operated for collapse or extension thereof and that this structure embodies the utmost economy of operation due to reduced wind resistance thereof when collapsed for ready portability by tractor vehicle. Likewise, ample head room is provided by the interior height of the vestibule structure, when extended, and ample storage space is provided by the arcuate extension at the forward portion of the stationary member 1 of the body. Furthermore, both extension and collapse of the body are achieved through operation of the crank to rotate the windlass shaft 53 in the same direction in either case as indicated by the arrows. The telescopic relation of the respective side walls of the stationary body member 1, the movable body member 2 and the vestibule 3, as shown in Figure 8, provides utmost strength in the collapsed structure, while the interlocking engagement of the flange means on the respective members produces a fully wind, rain and weatherproof structure when the body members are in extended position.

While the structure as illustrated is equipped with a transverse axle having two wheels, it is, of course, to be understood that a single wheel structure may be applied thereto by provision of a suitable central well in the floor 7 instead of the two wheel boxes 9. This construction is, in many cases, desirable because it permits of the additional lowering of the floor 7 in such manner as to further reduce the center of gravity of the body when collapsed. The slight height of the collapsed structure permits of full vision to the rear of the tractor vehicle, and a particularly meritorious advantage of the body construction is that increase of the interior space thereof from collapsed to expanded position is achieved entirely without increase of the width of the body structure.

Furthermore, as may be readily understood, the vehicle, when extended, will be maintained stationary without reliance upon the brakes of the tractor vehicle, which may be readily detached therefrom and used for running errands or the like. As will further appear, the extension or expansion of the collapsed body structure and the collapsing of the expanded or extended body structure may be accomplished very quickly and with the expenditure of but slight physical labor and with the utmost convenience. It is not necessary for the operator to remember a complex set of directions, it being merely necessary that the windlass shaft 53 and its pulleys or drums 54 be rotated in one direction (for both operations) and that slight physical force be exerted upon the bumper bar 50 and the vestibule member 3 during the operations of extending or collapsing the vehicle body.

In short, the operations performed are logical and are so simple that, after they have been once performed, there will never again be difficulty in repeating these operations. The provision of the combined screen and window slide having the mesh screen sheet 19 and glass plate 18 is especially meritorius in that it permits inhabitants of the vehicle to readily secure ventilation, when desired, or full enclosure of the structure when such may be desired.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a collapsible trailer body, a stationary body member, a movable body member, a movable vestibule member, and means for extending and/or collapsing said body including link means connecting said movable body member with said vestibule member, constant length cable means connecting said movable body member with said vestibule member, bar means swingable on said stationary body member, link means connecting said bar means with said vestibule member, windlass means supported for rotation by said bar means, and variable length cable means connected to said vestibule member and said windlass means.

2. In a collapsible trailer body, stationary body means, movable body means, movable vestibule means, and means for extending and/or collapsing said body including link means connecting one end of said movable body means with said vestibule means, constant length cable means connecting the other end of said movable body means with said vestibule means and having intermediate support on said stationary body means, bar means swingable on said stationary body means, link means connecting said bar means with said vestibule means, windlass means supported for rotation by said bar means, and variable length tension means connecting said vestibule means and said windlass means.

3. In a collapsible trailer body, a stationary body member, a movable body member, a movable vestibule member, and means for extending and/or collapsing said body including a variable length cable connected at one end to said vestibule member, windlass means having the other end of said cable connected thereto, a bumper bar swingable on said body and rotatably supporting said windlass means, said bumper bar providing means for initiating extending and collapsing movement of said body, providing means for supporting said vestibule member when extended, and providing bumper means for protecting said body when collapsed.

4. In a trailer body, a stationary body portion, an end extension body portion horizontally slidable and arcuately swingable relatively to said stationary body portion from a horizontal position to a vertical position, and an upper body portion having its top and sides movable upwardly in unison.

5. In a trailer body, a stationary body portion with sides, a vertically movable body portion with sides telescopically associated with said stationary sides in the closed position of said trailer body and with a top movable therewith as a unit, a longitudinally movable vestibule portion with sides telescopically associated with the sides of said stationary and movable body portions in said closed position and having pivotal connection means with each of the previously mentioned body portions, and a vestibule cover portion pivoted to said top, said cover portion forming an end closure for said trailer body in the closed position thereof and forming a vestibule top for said vestibule portion in the open position thereof.

6. In a trailer body, a stationary body portion with sides, a vertically movable body portion with sides telescopically associated with said stationary sides in the closed position of said trailer body and with a top movable therewith as a unit, and a longitudinally movable vestibule portion with sides telescopically associated with the sides of said stationary and movable body portions in said closed position and having pivotal connection means with each of the previously mentioned body portions, said pivotal connection means including links pivotally interconnecting said vestibule portion and said vertically movable body portion.

7. In a trailer body, a stationary body portion with sides, a vertically movable body portion with sides telescopically associated with said stationary sides in the closed position of said trailer body and with a top movable therewith as a unit, a longitudinally movable vestibule portion with sides telescopically associated with the sides of said stationary and movable body portions in said closed position and having pivotal connection means with each of the previously mentioned body portions, said pivotal connection means including links pivotally connected at one end to said vestibule portion and to said vertically movable body portion at the other end, and a horizontal pivot between said stationary body portion and said vestibule portion at a location intermediate the opposite ends of said vestibule portion.

8. In a trailer body, a stationary body portion with sides, a vertically movable body portion with sides telescopically associated with said stationary sides in the closed position of said trailer body and with a top movable therewith as a unit, a longitudinaly movable vestibule portion with sides telescopically associated with the sides of said stationary and movable body portions in said closed position and having pivotal connection means with each of the previously mentioned body portions, and a vestibule cover portion pivoted to said top, said cover portion forming an end closure for said trailer body in the closed position thereof and forming a vestibule top for said vestibule portion in the open position thereof, said pivotal connection means including links pivotally interconnecting said vestibule portion and said vertically movable body portion.

9. In a trailer body, a stationary body portion with parallel sides, an end extension portion with parallel sides swingable relatively to said stationary body portion from a horizontal closed position with said end portion sides and said body portion sides in adjacent telescoping parallel relationship to a vertical open position, and an upper body portion having a top and integrally connected parallel sides movable upwardly in unison as a unit.

10. In a trailer body, a stationary body portion with parallel sides, an end extension portion with parallel sides swingable relatively to said stationary body portion from a horizontal closed position with said end portion sides and said body portion sides in adjacent telescoping parallel relationship within said stationary body portion to a vertical open position outside said stationary body porton, and an upper body portion having a top and integrally connected parallel sides movable upwardly in unison from a closed position with said top sides and said body sides in adjacent telescoping parallel relationship.

11. In a trailer body, a stationary body portion with parallel sides, an end extension portion with parallel sides swingable relatively to said stationary body portion from a horizontal closed position with said end portion sides and said body portion sides in adjacent telescoping parallel relationship to a vertical open position, an upper body portion having a top and integrally connected parallel sides movable upwardly in unison as a unit from a closed position with said top sides and said body sides in adjacent parallel telescoping relationship to an open position, and an end extension cover portion pivoted to said top portion, said cover portion in its vertical position forming an end closure for said body portion in the closed position thereof and swingable upwardly into a horizontal position to form a top closure for said end portion in the open and extended position of said end portion.

LE ROY SMELKER.